(12) United States Patent
Kim

(10) Patent No.: US 9,442,327 B2
(45) Date of Patent: Sep. 13, 2016

(54) LIQUID CRYSTAL DISPLAY DEVICE

(71) Applicant: LG DISPLAY CO., LTD., Seoul (KR)

(72) Inventor: Youn-Oh Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/586,444

(22) Filed: Dec. 30, 2014

(65) Prior Publication Data

US 2016/0077369 A1 Mar. 17, 2016

(30) Foreign Application Priority Data

Sep. 11, 2014 (KR) ........................ 10-2014-0119931

(51) Int. Cl.
*G02F 1/1339* (2006.01)
*G02F 1/1343* (2006.01)
*G02F 1/1362* (2006.01)
*G02F 1/1368* (2006.01)

(52) U.S. Cl.
CPC ......... *G02F 1/13394* (2013.01); *G02F 1/1368* (2013.01); *G02F 1/134309* (2013.01); *G02F 1/136286* (2013.01)

(58) Field of Classification Search
CPC ........... H01L 27/1288; G02F 1/13394; G02F 1/136286; G02F 1/134309; G02F 1/1368
See application file for complete search history.

(56) References Cited

U.S. PATENT DOCUMENTS

| 6,067,144 A | 5/2000 | Murouchi |
| 2005/0099578 A1 | 5/2005 | Kim et al. |
| 2005/0270471 A1* | 12/2005 | Kitagawa ............ G02F 1/13394 349/156 |
| 2008/0007687 A1* | 1/2008 | Konno ................ G02F 1/13394 349/156 |
| 2011/0156039 A1 | 6/2011 | Baek et al. |
| 2011/0222016 A1 | 9/2011 | Kaneko et al. |
| 2012/0092596 A1* | 4/2012 | Cho .................... G02F 1/13394 349/106 |
| 2013/0001579 A1* | 1/2013 | Jung .................... H01L 27/088 257/72 |
| 2013/0021552 A1 | 1/2013 | Tomioka et al. |
| 2014/0168554 A1 | 6/2014 | Son et al. |

FOREIGN PATENT DOCUMENTS

| JP | 2002-196338 A | 7/2002 |
| JP | 2004-341214 A | 12/2004 |
| KR | 10-2008-0000791 A | 1/2008 |
| KR | 10-2008-0060825 A | 7/2008 |
| TW | 201011398 A | 3/2010 |
| TW | 201344314 A | 11/2013 |

* cited by examiner

*Primary Examiner* — Mohammad Islam
*Assistant Examiner* — Christina Sylvia
(74) *Attorney, Agent, or Firm* — Birch, Stewart, Kolasch & Birch, LLP

(57) ABSTRACT

A liquid crystal display device can include a first substrate including first and second pixel regions; a second substrate facing the first substrate; a thin film transistor in each of the first and second pixel regions; a pixel electrode on the first substrate and in each of the first and second pixel regions, the pixel electrode connected to the thin film transistor; a common electrode on the first substrate or the second substrate; first and second column spacers on the second substrate and corresponding to the first and second pixel regions, respectively; and a liquid crystal layer between the first and second substrates, wherein a first relative position of the first column spacer in the first pixel region is different from a second relative position of the second column spacer in the second pixel region.

16 Claims, 14 Drawing Sheets

LIQUID CRYSTAL DISPLAY DEVICE

The present application claims the benefit of Korean Patent Application No. 10-2014-0119931, filed in the Republic of Korea on Sep. 11, 2014, which is hereby incorporated by reference.

BACKGROUND OF THE INVENTION

1. Field of the Invention

The present invention relates to a liquid crystal display (LCD) device, and more particularly, to an LCD device having a uniform cell gap.

2. Discussion of the Related Art

Generally, the LCD device includes a first substrate, a second substrate and a spacer therebetween for maintaining a gap between the first and second substrate. The spacer is classified into a ball spacer and a column spacer according to its shape or forming process.

Recently, the column spacer, which is formed at a desired position and in a desired shape, is widely used. Generally, the column spacer is formed on the second substrate being fabricated by a less-numbered mask process than the first substrate. The column spacer is classified into a gap column spacer contacting the first substrate including a thin film transistor and a push column spacer that is spaced apart from the first substrate by a pre-determined distance.

FIG. 1 is a plane view of the related art LCD device.

As shown in FIG. 1, the related art LCD device includes a first substrate 10, which includes a thin film transistor (TFT) Tr, a pixel electrode 57 and a common electrode, a second substrate including a gap column spacer and a liquid crystal layer between the first substrate 10 and the second substrate.

On the first substrate 10, a plurality of gate lines 17 and a plurality of data lines 18 are formed. The gate lines 17 and the data lines 18 cross each other to define a plurality of pixel regions.

In each pixel region, the TFT Tr, which is connected to the gate line 17 and the data line 18, is formed at a crossing portion of the gate line 17 and the data line 18.

A first passivation layer, which covers the TFT Tr, is formed over the first substrate 10, and a second passivation layer is formed on the first passivation layer.

A portion of the second passivation layer, which corresponds to the TFT Tr, is removed to form a hole "hl" exposing a portion of the first passivation layer.

The common electrode is formed on the second passivation layer and over an entire surface of the first substrate 10. A third passivation layer is formed on the common electrode.

The pixel electrode 57, which is formed of a transparent conductive material and contacts a drain electrode 36 of the TFT Tr, is formed on the third passivation layer. The pixel electrode 57 includes at least one opening corresponding to the common electrode.

On the second substrate, which faces the first substrate 10, a black matrix, which corresponds to the TFT Tr and boundaries of the pixel region, and a color filter layer are formed. The color filter layer includes red, green and blue color filter patterns. An overcoat layer, which has a flat top surface, is formed on the color filter layer, and the gap column spacer, which has a column shape, is formed on the overcoat layer.

In this instance, the gap column spacer is positioned at a first portion 11 corresponding to the second passivation layer between adjacent holes "hl" such that an entire bottom surface of the gap column spacer contacts the third passivation layer on the second passivation layer.

A number and density of the gap column spacer are determined based on a contact density of the gap column spacer to the first substrate 10.

FIGS. 2A to 2C are cross-sectional views taken along the line II-II in FIG. 1. FIG. 2A shows a desired alignment state between the first and second substrates, and FIGS. 2B and 2C show a misalignment state between the first and second substrates.

As shown in FIGS. 2A to 2C, the TFT Tr is formed on the first substrate 10. The TFT Tr includes a semiconductor layer 13 including a first region 13a and second regions 13b at both sides of the first region 13a, a gate insulating layer 16, a gate electrode 21, an interlayer insulating layer 23, which includes semiconductor contact holes exposing the second regions 13b, a source electrode 33 and a drain electrode 36. The source and drain electrodes 33 and 36 contact the second regions 13b of the semiconductor layer 13 through the semiconductor contact holes.

The first passivation layer 41, which includes a drain contact hole "ch" exposing the drain electrode 36, is formed on the TFT Tr. In addition, the second passivation layer 51, which includes the hole "hl" corresponding to the TFT Tr, is formed on the first passivation layer 41.

The common electrode is formed on the second passivation layer 51, and the third passivation layer 55, which exposes the drain contact hole "ch", is formed on the common electrode. The pixel electrode, which contacts the drain electrode 36 through the drain contact hole "ch", is formed on the third passivation layer 55.

On the second substrate 20, the black matrix 61, the color filter layer 63, the overcoat layer 65 and the gap column spacer 75 are formed.

The first and second substrates 10 and 20 are attached such that the gap column spacer 75 contacts an element, e.g., the third passivation layer 55, on the first substrate 10.

Referring to FIG. 2A, an entire bottom surface of the gap column spacer 75 contacts the third passivation layer 55 on the second passivation layer 51 such that a cell gap of a liquid crystal panel is uniformly maintained.

Further, referring to FIG. 2B, when misalignment occurs between the first and second substrates 10 and 20, a portion of the bottom surface of the gap column spacer contacts the third passivation layer 55 and the other portion of the bottom surface of the gap column spacer is positioned at the hole "hl". Namely, the contact area between the gap column spacer and the third passivation layer 55 is reduced.

In addition, referring to FIG. 2C, when much misalignment occurs, an entire bottom surface of the gap column spacer 75 contacts the third passivation layer 55 in the hole "hl" such that the cell gap of the liquid crystal panel is reduced.

Accordingly, the cell gap of the liquid crystal panel is not uniform such that a desired amount of the liquid crystal layer is not filled. As a result, image quality is degraded. In addition, when a portion of the LCD device is touched or pushed, brightness non-uniformity is generated in the portion.

In a high pixel-per-inch model LCD device, a width of the second passivation layer 51 between adjacent holes "hl" is decreased. Accordingly, with a small outer impact or a little misalignment, the gap column spacer 75 is shifted to be inserted into the hole "hl" such that there is a big problem in the cell gap.

SUMMARY OF THE INVENTION

Accordingly, the present invention is directed to an LCD device that substantially obviates one or more of the problems due to limitations and disadvantages of the related art.

An object of the present invention is to provide an LCD device having a uniform cell gap.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device can include a first substrate including first and second pixel regions; a second substrate facing the first substrate; a thin film transistor in each of the first and second pixel regions; a pixel electrode on the first substrate and in each of the first and second pixel regions, the pixel electrode connected to the thin film transistor; a common electrode on the first substrate or the second substrate; first and second column spacers on the second substrate and corresponding to the first and second pixel regions, respectively; and a liquid crystal layer between the first and second substrates, wherein a first relative position of the first column spacer in the first pixel region is different from a second relative position of the second column spacer in the second pixel region.

In another aspect of the present invention, a liquid crystal display device can include a first substrate including first to fourth pixel regions; first to fourth thin film transistors in the first to fourth pixel regions, respectively; a first passivation layer including first to fourth holes respectively exposing the first to fourth thin film transistors; a common electrode on the first passivation layer; a second passivation layer on the common electrode and having a drain contact hole in the first to fourth holes, a drain electrode of each of the first to fourth thin film transistors exposed through the drain contact hole; a pixel electrode on the second passivation layer and in each of the first to fourth pixel region, the pixel electrode electrically connected to the first to fourth thin film transistors, respectively; first and second column spacers on a second substrate and corresponding to the first and third pixel regions; and a liquid crystal layer between the first and second substrates, wherein a first contact area between the first column spacer and the second passivation layer is larger than a second contact area between the second column spacer and the second passivation layer.

In another aspect of the present invention, a liquid crystal display device can include first and second substrates facing each other; a gate line on the first substrate; first and second data lines on the first substrate and crossing the gate line to define first and second pixel regions; a thin film transistor in each of the first and second pixel regions and connected to the gate line and one of the first and second data lines; a pixel electrode on the first substrate and connected to the thin film transistor; a common electrode on the first substrate or the second substrate; first and second column spacers on the second substrate and corresponding to the first and second pixel regions, respectively; and a liquid crystal layer between the first and second substrates, wherein an end of the first column spacer is a first distance away from the first data line, and an end of the second column spacer is a second distance away from the second data line, which is different from the first distance.

In another aspect of the present invention, a liquid crystal display device includes a first substrate including first and second pixel regions; a second substrate facing the first substrate; first and second thin film transistors in the first and second pixel regions, respectively; a passivation layer on the first and second thin film transistors and including first and second contact holes respectively exposing a drain electrode of each of the first and second thin film transistors; a pixel electrode on the first substrate and in each of the first and second pixel regions, the pixel electrode connected to each of the first and second thin film transistors; a common electrode on the first substrate or the second substrate; first and second column spacers on the second substrate and corresponding to the first and second pixel regions, respectively; and a liquid crystal layer between the first and second substrates, wherein the first column spacer is a first distance away from the first contact hole, and the second column spacer is a second distance away from the second contact hole, which is different from the first distance.

It is to be understood that both the foregoing general description and the following detailed description are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
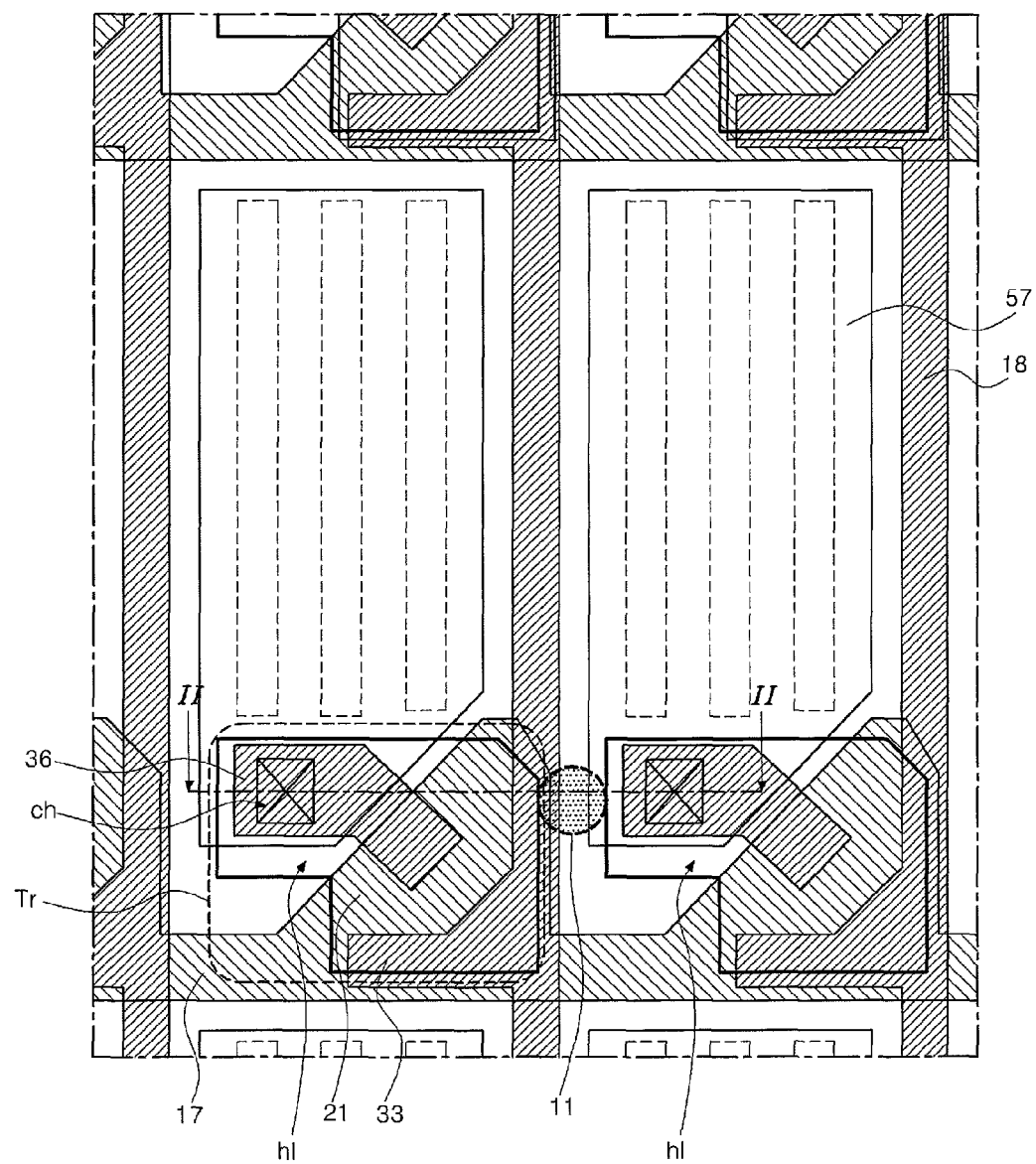
FIG. 1 is a plane view of the related art LCD device.
Figure 2A:
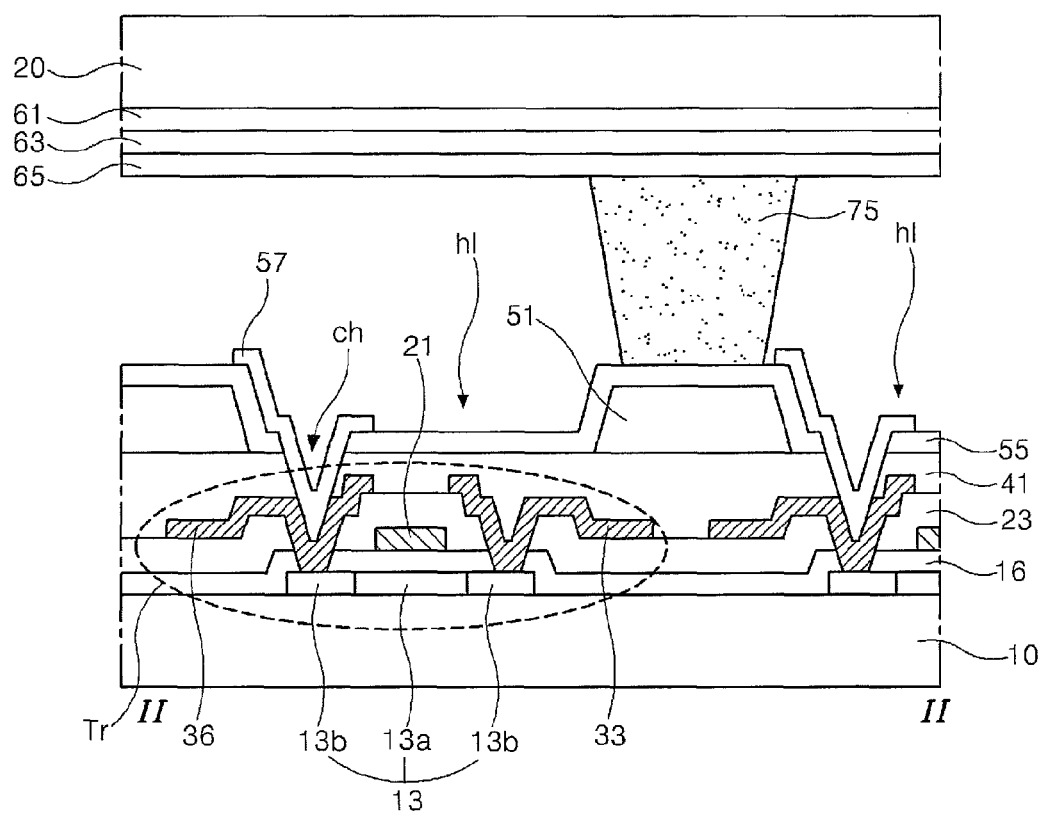
FIGS. 2A to 2C are cross-sectional views taken along the line II-II in FIG. 1.
Figure 2B:
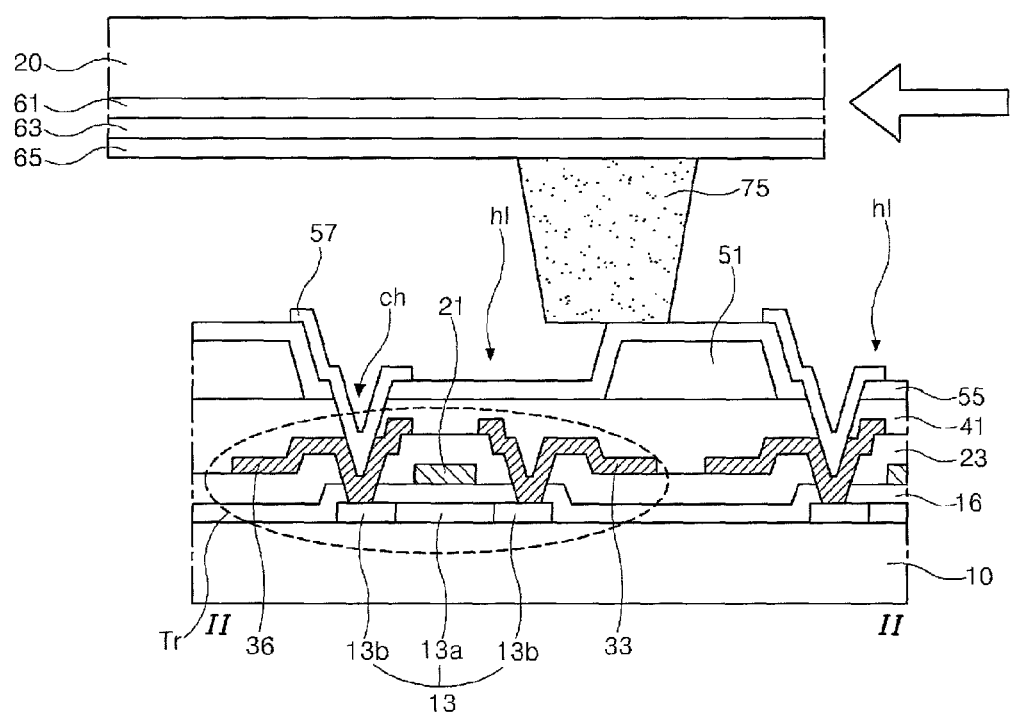
Figure 2C:
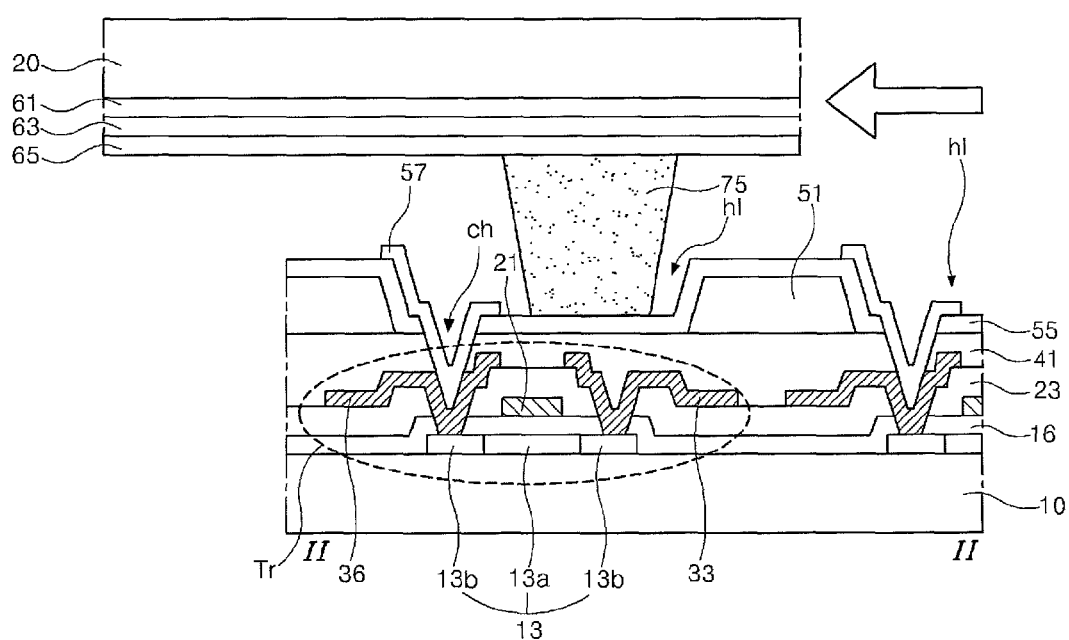
Figure 3A:
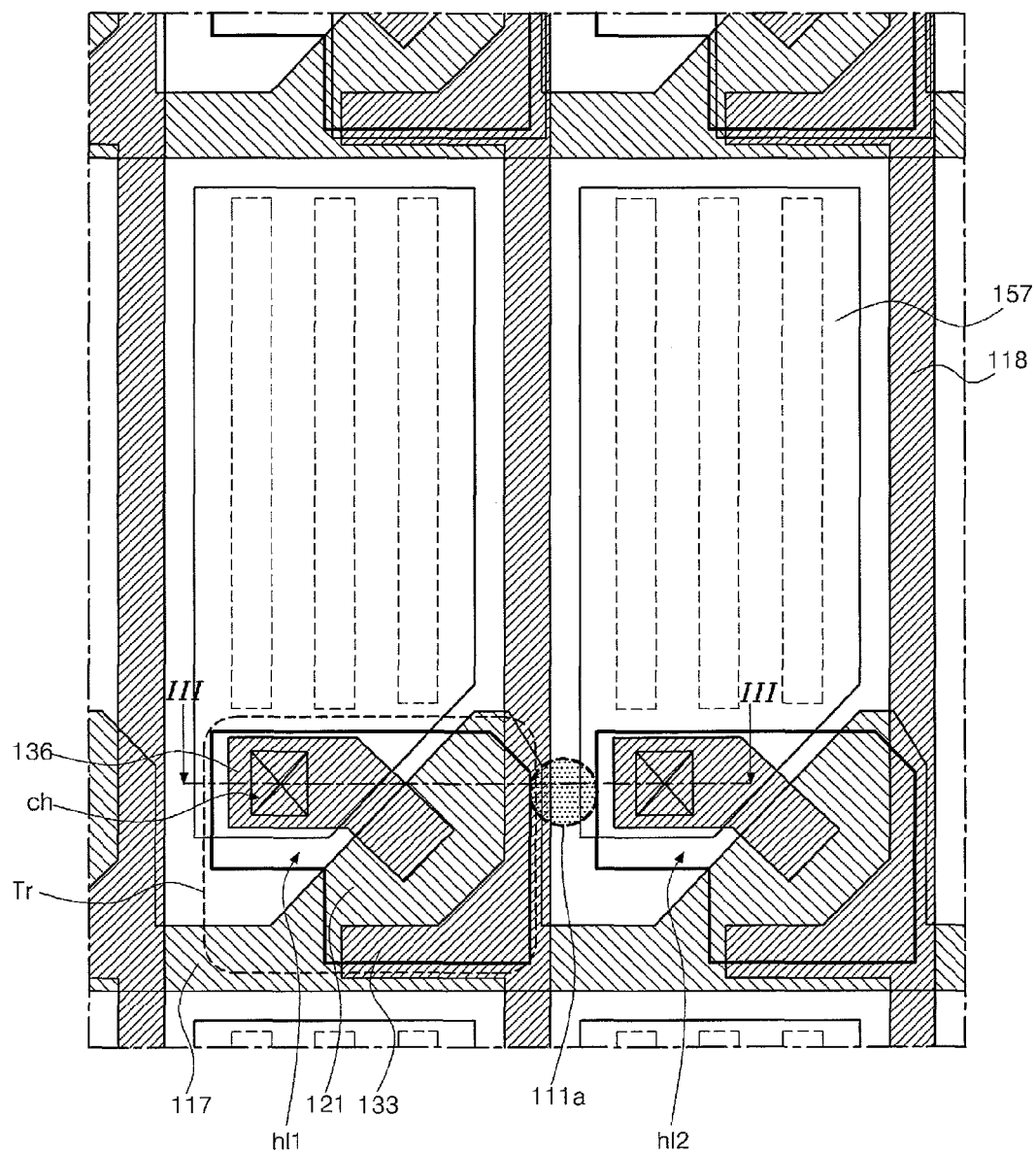
FIGS. 3A to 3C are plane views of pixel regions of an LCD device according to an embodiment of the present invention.
Figure 3B:
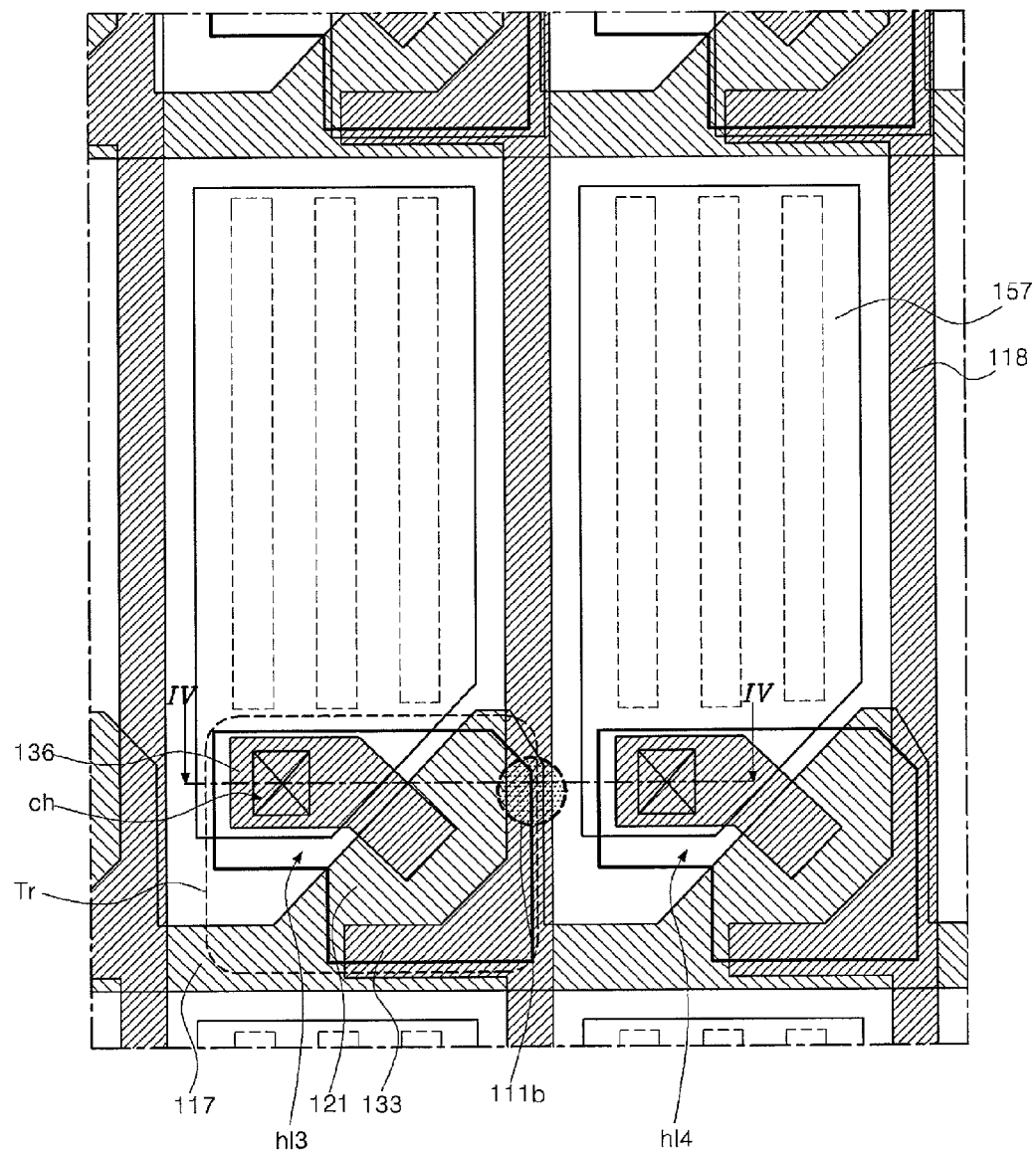
Figure 3C:
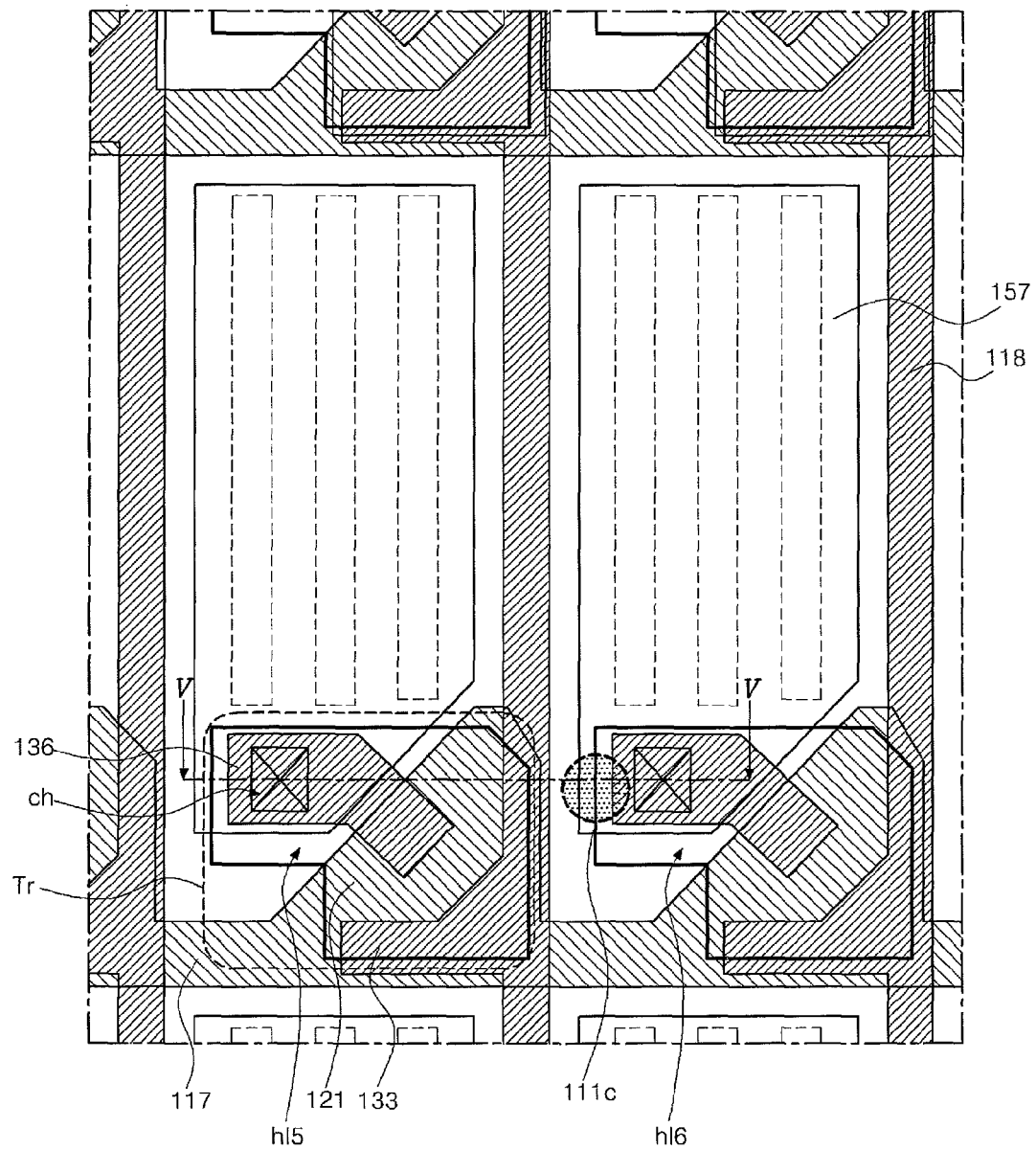

FIGS. 3A to 3C are plane views of pixel regions of an LCD device according to an embodiment of the present invention.

As shown in FIGS. 3A to 3C, an LCD device according to an embodiment of the present invention includes a first substrate 110, which includes a thin film transistor (TFT) Tr, a pixel electrode 157 and a common electrode, a second substrate, which includes a column spacer and a liquid crystal layer between the first substrate 110 and the second substrate.

On the first substrate 110, a plurality of gate lines 117 and a plurality of data lines 118 are formed. The gate lines 117 and the data lines 118 cross each other to define a plurality of pixel regions. Namely, the gate line 117 extends along a first direction, and the data line 118 extends along a second direction. Each of the gate line 117 and the data line 118 includes a low resistance material. For example, each of the gate line 117 and the data line 118 may include at least one of aluminum (Al), Al alloy (AlNd), copper (Cu), Cu alloy, molybdenum (Mo) and Mo alloy (MoTi).

In each pixel region, the TFT Tr, which is connected to the gate line 117 and the data line 118, is formed at a crossing portion of the gate line 117 and the data line 118. The TFT includes a gate electrode 121, a gate insulating layer, a semiconductor layer, a source electrode 133 and a drain electrode 136.

In FIGS. 3A to 3C, a channel of the TFT Tr has an "U" shape rotated by about 45 degrees with respect to the gate line 117. However, it is not limited thereto.

A first passivation layer, which covers the TFT Tr, is formed over the first substrate 110, and a second passivation layer is formed on the first passivation layer. For example, the first passivation layer is formed of an inorganic insulating material, and the second passivation layer is formed of an organic insulating material. In this instance, the second passivation layer may be formed of photo-acryl having a relatively low dielectric constant.

In the first passivation layer, a drain contact hole "ch" is formed to expose the drain electrode 136 of the TFT Tr. In addition, in the second passivation layer, first to sixth holes "hl1" to "hl6" are formed in correspondence to the TFT Tr in each pixel region. Each of the first to sixth holes "hl1" to "hl6" has a size larger than the drain contact hole "ch" in each pixel region and exposes the first passivation layer on the TFT Tr.

On the second passivation layer including the first to sixth holes "hl1" to "hl6", the common electrode covering an entire surface of a display region, which includes the pixel regions, is formed. The common electrode includes a transparent conductive material and has a plate shape in the display region.

A third passivation layer is formed on the common electrode and over the second passivation layer. The third passivation layer is partially removed in the first to sixth holes "hl1" to "hl6" to expose the drain contact hole "ch" in the first passivation layer. Namely, the first and third passivation layers includes the drain contact hole "ch" in each of first to sixth holes "hl1" to "hl6" to expose the drain electrode 136.

On the third passivation layer, the pixel electrode 157, which contacts the drain electrode 136 of the TFT Tr through the drain contact hole "ch", is formed. The pixel electrode 157 includes a transparent conductive material and a plate shape in each pixel region. The pixel electrode 157 includes at least one opening corresponding to the common electrode such that a fringe field is generated between the common electrode and the pixel electrode 157.

On the second substrate, which faces the first substrate 110, a black matrix, which corresponds to the TFT Tr and boundaries of the pixel region, and a color filter layer are formed. The color filter layer includes red, green and blue color filter patterns. An overcoat layer, which has a flat top surface, is formed on the color filter layer, and the column spacers, which have a column shape, are formed on the overcoat layer. The column spacers serve as a gap column spacer.

Referring to FIG. 3A, a first column spacer is positioned at a first portion 111a corresponding to a portion of the second passivation layer between the first and second holes "hl1" and "hl2". As a result, an entirety of a bottom surface of the first column spacer contacts the third passivation layer on the portion of the second passivation layer between the first and second holes "hl1" and "hl2".

Referring to FIG. 3B, a second column spacer is positioned at a second portion 111b such that a part of the bottom surface of the second column spacer contacts the third passivation layer. Namely, the second column spacer is positioned between the second passivation layer, which is positioned between the third and fourth holes "hl3" and "hl4", and the third hole "hl3".

Referring to FIG. 3C, a third column spacer is positioned at a third portion 111c such that a part of the bottom surface of the third column spacer contacts the third passivation layer. Namely, the third column spacer is positioned between the second passivation layer, which is positioned between the fifth and sixth holes "hl5" and "hl6", and the sixth hole "hl6".

In other words, a position of the second column spacer is shifted along a first direction, e.g., a left direction, with respect to the first column spacer, and a position of the third column spacer is shifted along a second direction, e.g., a right direction, with respect to the first column spacer.

A number and density of the column spacers are determined based on a contact density of the first to third column spacers to the first substrate 110.

Figure 4A:
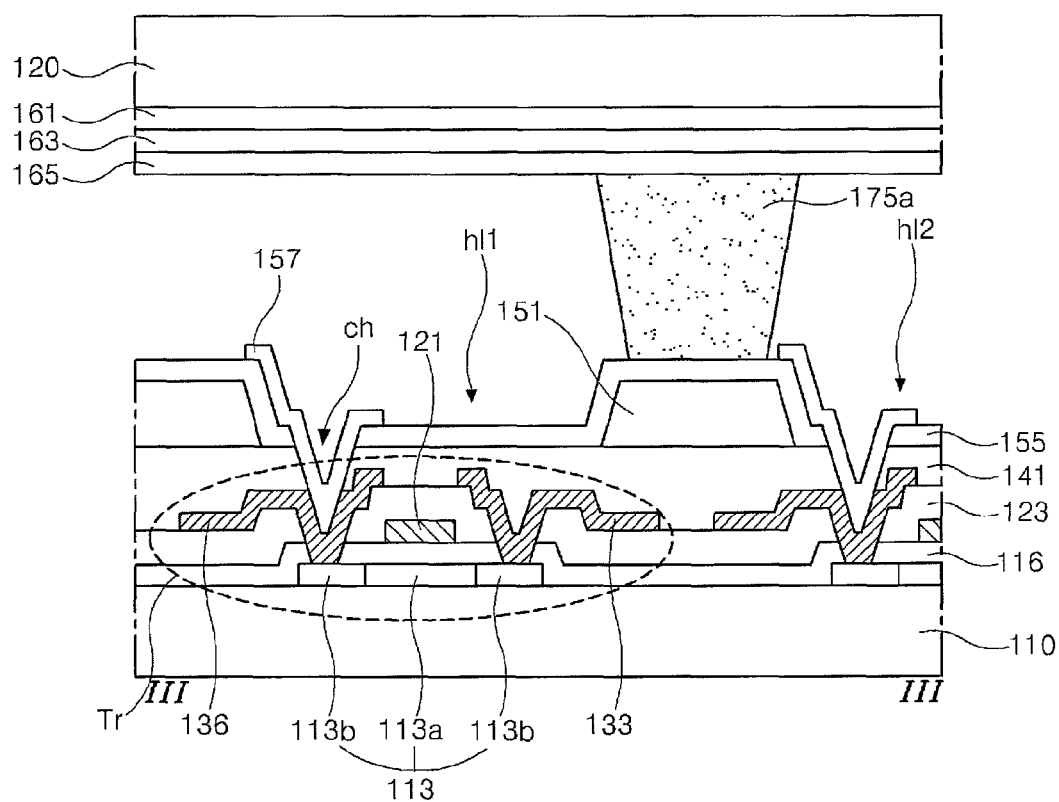
FIGS. 4A to 4C are cross-sectional views taken along the lines III-III in FIG. 3A, IV-IV in FIG. 3B and V-V in FIG. 3C, respectively.
Figure 4B:
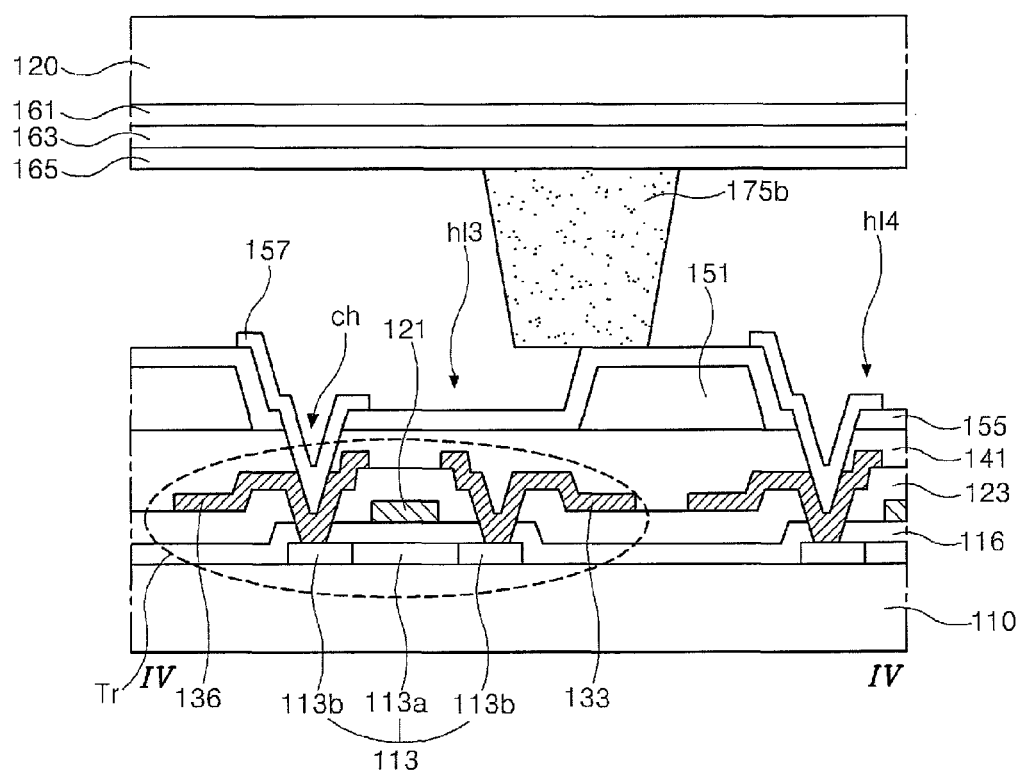
Figure 4C:
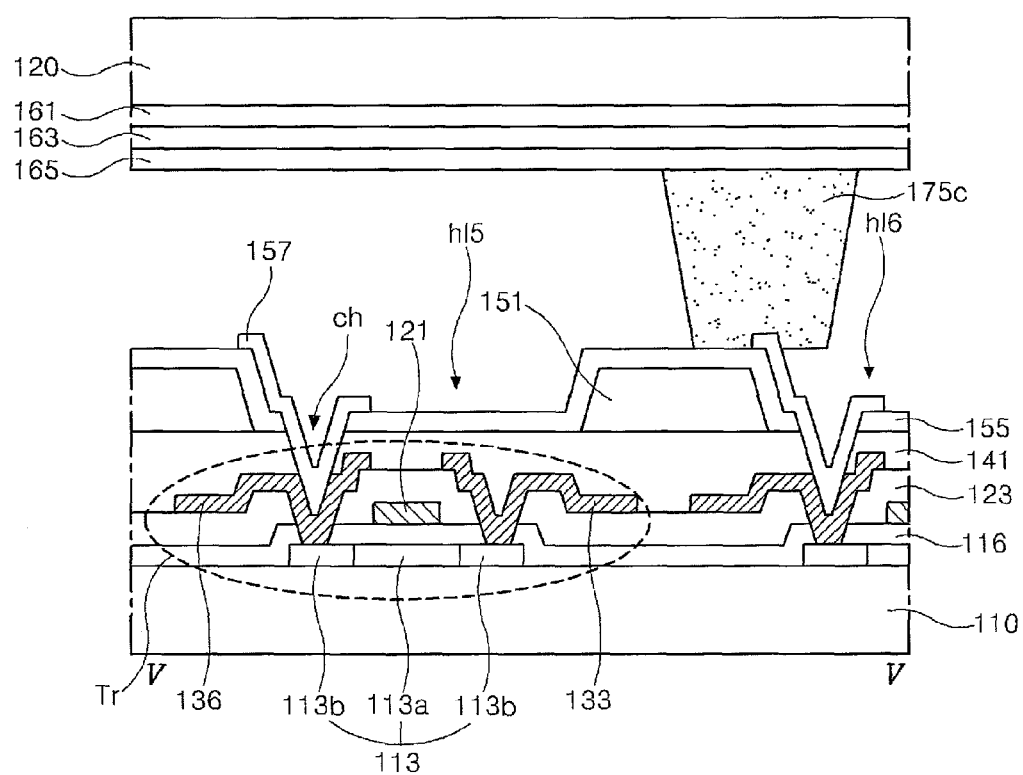

FIGS. 4A to 4C are cross-sectional views taken along the lines III-III in FIG. 3A, IV-IV in FIG. 3B and V-V in FIG. 3C, respectively.

As shown in FIGS. 4A to 4C, an LCD device according to an embodiment of the present invention includes the first substrate 110, which includes the TFT Tr, the pixel electrode 157 and the common electrode, a second substrate 120, which includes first to third column spacers 175a, 175b and 175c and a liquid crystal layer between the first substrate 110 and the second substrate 120.

On the first substrate 110, which includes glass or plastic to have a transparent property and an insulating property, the semiconductor layer 113 including a first region 113a and second regions 113b at both sides of the first region 113a is formed. The gate insulating layer 116 is formed on the first substrate 110 including the semiconductor layer 113. The gate insulating layer 116 includes an inorganic insulating material. For example, the gate insulating layer may be formed of silicon oxide or silicon nitride.

The gate line 117 (of FIG. 3A) extending along a first direction is formed on the gate insulting layer 116. The gate line 117 includes a low resistance metallic material. For example, the gate line 117 may be formed of at least one of aluminum (Al), Al alloy (AlNd), copper (Cu), Cu alloy, molybdenum (Mo) and Mo alloy (MoTi). In addition, the gate electrode 121, which is connected to the gate line, is formed on the gate insulting layer 116. The gate electrode 121 is formed of the same material and on the same layer as the gate line 117.

The interlayer insulating layer 123 is formed on the gate electrode 121 and the gate insulating layer 116, and a source electrode 133 and a drain electrode 136 are formed on the interlayer insulating layer 123. The source and drain electrodes 133 and 136 are spaced apart from each other.

The semiconductor layer 113, the gate insulating layer 116, the gate electrode 121, the interlayer insulating layer 123, the source electrode 133 and the drain electrode 136 constitute the TFT Tr.

On the interlayer insulating layer 123, the data line 118 (of FIG. 3A), which is connected to the source electrode 133, is formed. The data line 118 crosses the gate line 117 to define the pixel region.

The first passivation layer 141, which includes an inorganic insulating material, is formed over the first substrate 110 including the data line 118, the source electrode 133 and the drain electrode 136. For example, the first passivation layer 141 may be formed of silicon oxide or silicon nitride.

The second passivation layer 151, which includes an organic insulating material having a relatively low dielectric constant, is formed on the first passivation layer 141. For example, the second passivation layer 151 may be formed of photo-acryl.

When the second passivation layer 151 is formed without the first passivation layer 141, a channel of the TFT Tr may be contaminated by the material of the second passivation layer 151. The first passivation layer 141 is formed to prevent the above problem.

The second passivation layer 151 includes first to sixth holes "hl1" to "hl6". The first to sixth holes "hl1" to "hl6" respectively correspond to the TFT Tr in each pixel such that the first passivation layer 141 on the TFT Tr is exposed through the first to sixth holes "hl1" to "hl6".

The common electrode is formed on the second passivation layer 151, which includes the first to sixth holes "hl1" to "hl6", and over an entire surface of the display region. The common electrode is formed of a transparent conductive material, e.g., indium-tin-oxide (ITO) or indium-zinc-oxide (IZO). The common electrode may have a TFT contact hole exposing the TFT Tr to prevent a parasitic capacitance between the common electrode and the electrodes of the TFT Tr.

The third passivation layer 155 is formed on the first passivation layer 141, the second passivation layer 151 and the common electrode. The third passivation layer 155 covers an entire surface of the first substrate 110 except the drain contact hole "ch". The drain electrode 136 is exposed thorough the drain contact hole "ch" in the first and third passivation layers 141 and 155. Namely, the third passivation layer 155 is formed in the first to third holes "hl1" to "hl6". The third passivation layer 155 is formed of an inorganic insulating material, e.g., silicon oxide or silicon nitride.

In addition, the pixel electrode 157 is formed on the third passivation layer 155. The pixel electrode 157 contacts the drain electrode 136 through the drain contact hole "ch" in the first to sixth holes "hl1" to "hl6" and is formed of a transparent conductive material, e.g., indium-tin-oxide (ITO) or indium-zinc-oxide (IZO). The pixel electrode 157 has a plate shape in each pixel region and includes at least an opening. As a result, the pixel electrode 157 and the common electrode generate a fringe field.

On the second substrate 120, which faces the first substrate 110, a black matrix 161, which corresponds to the TFT Tr and boundaries of the pixel region, and a color filter layer 163 are formed. The color filter layer 163 includes red, green and blue color filter patterns. An overcoat layer 165, which has a flat top surface, is formed on the color filter layer, and the first to third column spacers 175a, 175b and 175c, each of which has a column shape, are formed on the overcoat layer 165. In addition, a push column spacer, which has a smaller thickness or height than the first to third column spacers 175a, 175b and 175c, may be further formed on the overcoat layer 165. The push column spacer is spaced apart from an uppermost layer, e.g., the third passivation layer 155 or the pixel electrode 157, of the first substrate 110.

Referring to FIG. 4A, the first column spacer 175a is positioned at the first portion 111a (of FIG. 3A) corresponding to a portion of the second passivation layer 151 between the first and second holes "hl1" and "hl2". As a result, an entirety of a bottom surface of the first column spacer 175a contacts the third passivation layer 155 on the second passivation layer 151 between the first and second holes "hl1" and "hl2".

Referring to FIG. 4B, a second column spacer 175b is positioned at the second portion 111b (of FIG. 3B) such that a part of the bottom surface of the second column spacer 175b contacts the third passivation layer 155 and the other part of the bottom surface of the second column spacer 175b is disposed at the third hole "hl3". Namely, the second column spacer 175b is positioned between the second passivation layer 151, which is positioned between the third and fourth holes "hl3" and "hl4", and the third hole "hl3".

Referring to FIG. 4C, a third column spacer 175c is positioned at the third portion 111c (of FIG. 3C) such that a part of the bottom surface of the third column spacer 175c contacts the third passivation layer 155 and the other part of the bottom surface of the third column spacer 175c is disposed at the sixth hole "hl6". Namely, the third column spacer 175c is positioned between the second passivation layer 151, which is positioned between the fifth and sixth holes "hl5" and "hl6", and the sixth hole "hl6". In FIG. 4C, the third column spacer 175c contacts the pixel electrode 157. However, when the pixel electrode 157 is not extended over an upper surface of the second passivation layer 151, the third column spacer 175c does not contact the pixel electrode 157.

In other words, a position of the second column spacer 175b is shifted along a first direction, e.g., a left direction, with respect to the placement of the first column spacer 175a, and a position of the third column spacer 175c is shifted along a second direction, e.g., a right direction, with respect to the placement of the first column spacer 175a. In other words, the relative positions of the first to third column spacers 175a, 175b and 175c are different from each other in each of their respective pixel regions. A first contact area between the first column spacer 175a and the third passivation layer 155 is different from a second contact area between the second column spacer 175b and the third passivation layer 155 and a third contact area between the third column spacer 175c and the third passivation layer 155.

A number and density of the first to third column spacers 175a, 175b and 175c are determined based on a contact density of the first to third column spacers 175a, 175b and 175c to the first substrate 110.

In addition, the first and second substrates 110 and 120 are attached with a liquid crystal layer therebetween. A seal pattern is formed at edges of the first and second substrates 110 and 120 to prevent leakage of the liquid crystal layer.

Referring to FIGS. 3A to 3C and 4A to 4C, one side of the first to third column spacers 175a, 175b and 175c has a difference in a distance from the data line 118. In other words, the first to third column spacers 175a, 175b and 175c are placed at different distances away from their respective data line 118. As shown in FIG. 3A, the first column spacer 175a (of FIG. 4A) positioned at the first portion 111a has a first distance away from the data line 118. As shown in FIG. 3B, the second column spacer 175b (of FIG. 4B) positioned at the second portion 111b has a second distance away from the data line 118, which is smaller than the first distance regarding the first column spacer 175a. In addition, as shown in FIG. 3C, the third column spacer 175c (of FIG. 4B) is positioned at the third portion 111c having a third distance away from the data line 118, which is larger than the first distance with which column spacer 175a is positioned away from its respective data line 118.

In addition, the first to third column spacers 175a, 175b and 175c are placed at different distances away from the respective drain contact hole "ch". As shown in FIG. 4A, the first column spacer 175a is a first distance away from the drain contact hole "ch". As shown in FIG. 4B, the second column spacer 175b is a second distance away from the drain contact hole "ch", which is smaller than the first distance that the first column spacer 175a is positioned away from its respective drain contact hole "ch". As shown in FIG. 4C, the third column spacer 175c is a third distance away from the drain contact hole "ch", which is larger than the first distance.

Figure 5A:
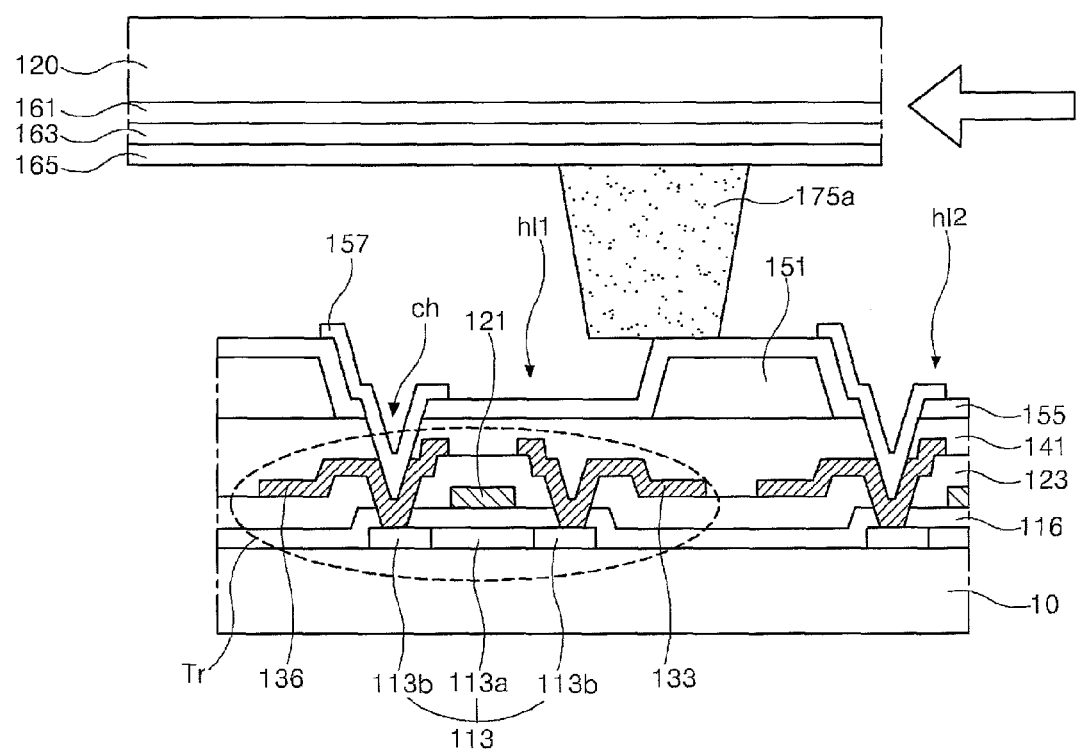
FIGS. 5A to 5C are cross-sectional views illustrating a misalignment state in an LCD device according to an embodiment of the present invention.
Figure 5B:
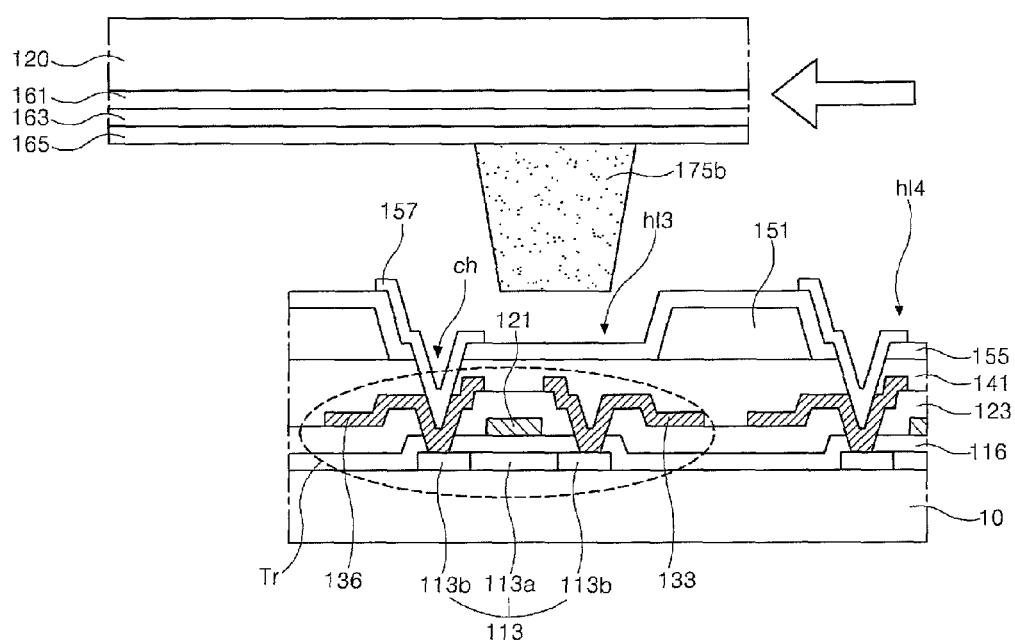
Figure 5C:
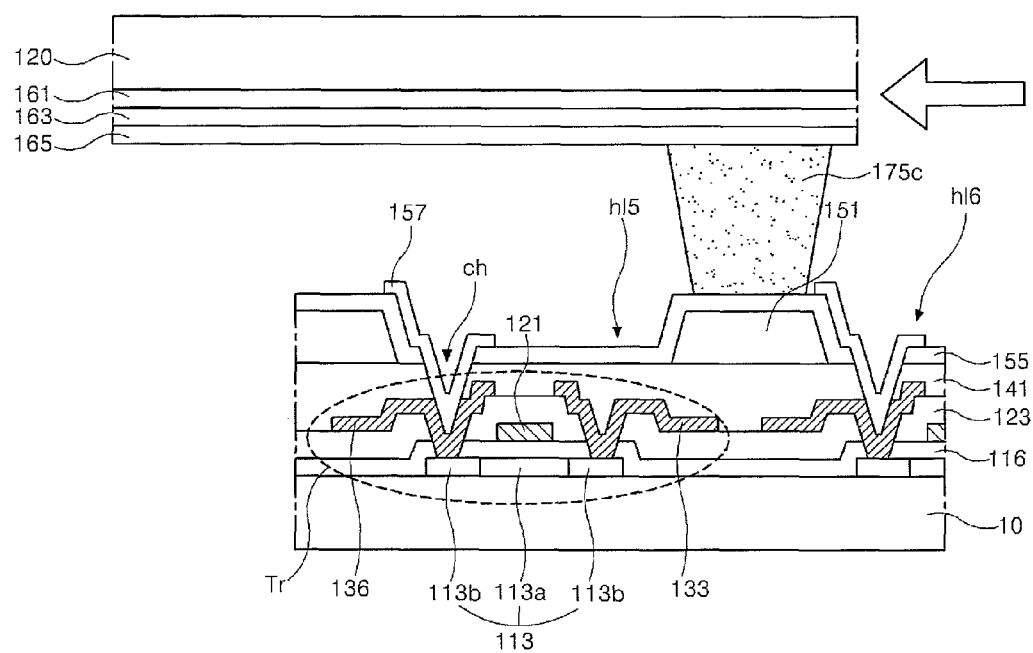

FIGS. 5A to 5C are cross-sectional views illustrating a misalignment state in an LCD device according to an embodiment of the present invention. FIGS. 5A to 5C show the second substrate 120 after it has been shifted along a left direction, i.e., in the direction of the arrow.

Referring to FIG. 5A, the first column spacer 157a on the second substrate 120 is shifted along the left direction. As a result, the first column spacer 157a is now positioned between the second passivation layer 151 and the first hole "hl1" such that a part of the bottom surface of the first column spacer 175a contacts the third passivation layer 155 on the second passivation layer 151 between the first and second holes "hl1" and "hl2".

Referring to FIG. 5C, when the second substrate 120 becomes misaligned with the first substrate 110, the third column spacer 175c is also shifted such that the third column spacer 175c is positioned over the second passivation layer 151. As a result, an entirety of a bottom surface of the third column spacer 175c contacts the third passivation layer 155 on the second passivation layer 151 between the fifth and sixth "hl5" and "hl6".

Referring to FIG. 5B, when the second substrate 120 is misaligned with the first substrate 110, the second column spacer 175b is also shifted such that the second column spacer 175b is positioned to correspond to the third hole "hl3". However, due to the first and third column spacers 175a and 175c, the second column spacer 175b is not inserted into the third hole "hl3". In other words, the second column spacer 175b is spaced apart from the third passivation layer 155 in the third hole "hl3" such that a cell gap of the liquid crystal panel is maintained.

Namely, even if the second column spacer 175b does not contact the third passivation layer 155 on the second passivation layer 151 because of a misalignment, the first and third column spacers 175a and 175c still contact the third passivation layer 155 on the second passivation layer 151 such that a gap between the first and second substrates 110 and 120 is uniformly maintained.

Further, when the second substrate 120 is shifted along a right direction, the third column spacer 175c may be positioned to correspond to the sixth hole "hl6". In this instance, the first and second column spacers 175a and 175b still contact the third passivation layer 155 such that the cell gap of the liquid crystal panel is maintained.

Figure 6:
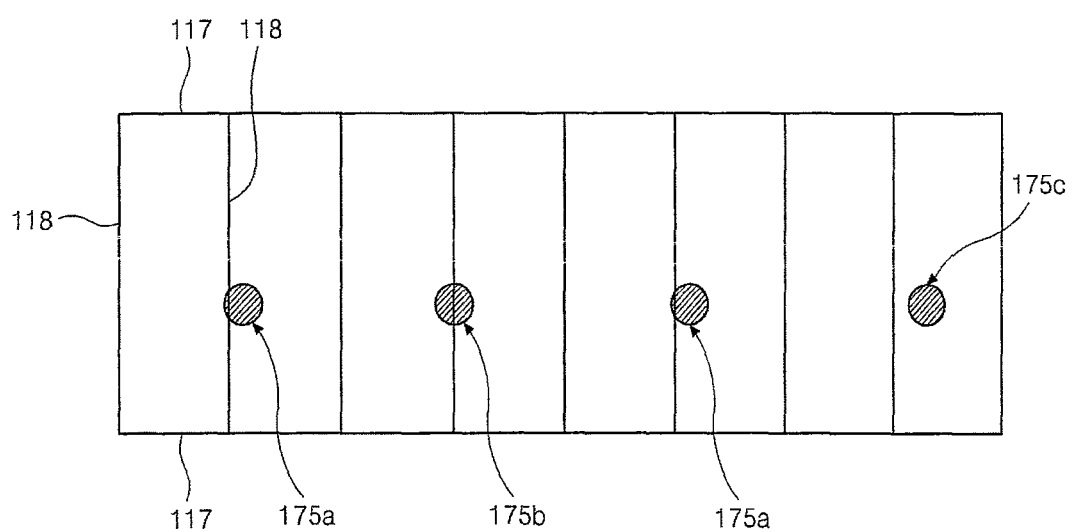
FIG. 6 illustrates a plane view of pixels regions according to an embodiment of the present invention.

When misalignment is not generated, as shown in FIGS. 4A to 4C, the cell gap is securely maintained by the first column spacer 175a. When misalignment along the left direction is generated, the cell gap is securely maintained by the third column spacer 175c. When misalignment along the right direction is generated, the cell gap is securely maintained by the second column spacer 175b. As shown in FIG. 6, the misalignment occurs less often than the alignment, a number of the first column spacer 175a can be larger than each of the second and third column spacers 175b and 175c (e.g., first column spacer 175a:second column spacer 175b: third column spacer 175c=2:1:1).

To compensate for misalignment in both the right direction and the left direction, the second and third column spacers 175b and 175c are positioned on opposite sides with respect to the first column spacer 175a. Namely, the second column spacers 175b is positioned at a first side of the first column spacer 175a, and the third column spacer 175c is positioned at a second side, i.e. opposite to the first side of the first column spacer 175a. As a result, the first column spacer 175a is positioned between the second and third column spacers 175b and 175c.

FIGS. 3A to 3C, 4A to 4C and 5A to 5C show the first to third column spacers. However, the LCD device may include two column spacers. In this instance, a relative position of the first column spacer is shifted from a relative position of the second column spacer. The misalignment problem can be compensated by two column spacers.

In addition, it is explained that the common electrode is formed on the first substrate. However, the common electrode may be formed on the second substrate to generate a vertical electric field with the pixel electrode. Alternatively, the common electrode and the pixel electrode, each of which has a bar shape, may be formed on the first substrate with alternating each other.

In the present invention, since the second and third column spacers are shifted in opposite directions with respect to the first column spacer, the cell gap of the liquid crystal panel is uniformly maintained even when the misalignment is generated. Accordingly, the problems, e.g., image quality degradation, brightness no-uniformity, and so on, in the related art LCD device are prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display device, comprising:
a first substrate including first, second and third pixel regions;
a second substrate facing the first substrate;
a thin film transistor in each of the first, second and third pixel regions;
a pixel electrode on the first substrate and in each of the first, second and third pixel regions, the pixel electrode connected to the thin film transistor;
a common electrode on the first substrate or the second substrate;
a passivation layer over the first substrate;
first, second and third column spacers on the second substrate and corresponding to the first, second and third pixel regions, respectively; and
a liquid crystal layer between the first and second substrates,
wherein a first relative position of the first column spacer in the first pixel region is different from both a second relative position of the second column spacer in the second pixel region and a third relative position of the third column spacer in the third pixel region, and
wherein a number of the first column spacers is larger than both a number of the second column spacers and a number of the third column spacers, and all of bottom surfaces of the first, second and third column spacers at least partially overlap an upper surface of the passivation layer.

2. The liquid crystal display device according to claim 1, wherein the pixel electrode is disposed on the passivation layer, and a contact area of the first column spacer with the passivation layer is larger than a contact area of the second column spacer with the passivation layer.

3. The liquid crystal display device according to claim 2, wherein an entirety of a bottom surface of the first column spacer contacts the passivation layer, and a part of a bottom surface of the second column spacer contacts the passivation layer.

4. The liquid crystal display device according to claim 3, wherein the passivation layer includes a hole corresponding to the thin film transistor in the second pixel region, and the other part of the bottom surface of the second column spacer is positioned at the hole.

5. The liquid crystal display device according to claim 1, wherein the first column spacer is positioned between the second and third column spacers.

6. A liquid crystal display device, comprising:
a first substrate including first, second, third, fourth, fifth and sixth pixel regions;
first, second, third, fourth, fifth and sixth thin film transistors in the first, second, third, fourth, fifth and sixth pixel regions, respectively;
a first passivation layer including first, second, third, fourth, fifth and sixth holes respectively exposing the first, second, third, fourth, fifth and sixth thin film transistors;
a common electrode on the first passivation layer;
a second passivation layer on the common electrode and having a drain contact hole in the first, second, third, fourth, fifth and sixth holes, respectively, wherein a drain electrode of each of the first, second, third, fourth, fifth and sixth thin film transistors is exposed through the drain contact hole, respectively;
a pixel electrode on the second passivation layer and in each of the first, second, third, fourth, fifth and sixth pixel regions, the pixel electrode electrically connected to the first, second, third, fourth, fifth and sixth thin film transistors, respectively;
first, second and third column spacers on a second substrate and corresponding to the first, third and fifth pixel regions, respectively; and
a liquid crystal layer between the first and second substrates,
wherein a first contact area between the first column spacer and the second passivation layer is larger than a second contact area between the second column spacer and the second passivation layer,
wherein a first relative position of the first column spacer in the first pixel region is different from both a second relative position of the second column spacer in the third pixel region and a third relative position of the third column spacer in the fifth pixel region, and
wherein a number of the first column spacers is larger than both a number of the second column spacers and a number of the third column spacers, and all of bottom surfaces of the first, second and third column spacers at least partially overlap an upper surface of the second passivation layer.

7. The liquid crystal display device according to claim 6, wherein a bottom surface of the first column spacer completely contacts the second passivation layer, and a bottom surface of the second column spacer partially contacts the second passivation layer.

8. The liquid crystal display device according to claim 7, wherein an end of the second column spacer is positioned at the third hole or the fourth hole.

9. The liquid crystal display device according to claim 6, wherein a third contact area between the third column spacer and the second passivation layer is smaller than the first contact area between the first column spacer and the second passivation layer.

10. The liquid crystal display device according to claim 6, wherein the first column spacer is positioned between the second and third column spacers.

11. The liquid crystal display device according to claim 6, wherein a bottom surface of the first column spacer completely contacts the second passivation layer, and a bottom surface of each of the second and third column spacers partially contacts the second passivation layer.

12. The liquid crystal display device according to claim 11, wherein an end of the second column spacer is positioned at the third hole, and an end of the third column spacer is positioned at the sixth hole.

13. The liquid crystal display device according to claim 6, wherein a first relative position of the second column spacer in the third pixel region is shifted along a direction from a second relative position of the first column spacer in the first pixel region, and a third relative position of the third column spacer in the fifth pixel region is shifted along an opposite direction from the second relative position.

14. The liquid crystal display device according to claim 6, wherein the first column spacer is a first distance away from the drain contact hole in the first pixel region, and the second column spacer is a second distance away from the drain contact hole in the third pixel region, and wherein the second distance is smaller than the first distance.

15. A liquid crystal display device, comprising:
first and second substrates facing each other;
a gate line on the first substrate;
first, second and third data lines on the first substrate and crossing the gate line to define first, second and third pixel regions;
a thin film transistor in each of the first, second and third pixel regions and connected to the gate line and one of the first, second and third data lines;
a pixel electrode on the first substrate and connected to the thin film transistor;
a common electrode on the first substrate or the second substrate;
first, second and third column spacers on the second substrate and corresponding to the first, second and third pixel regions, respectively; and
a liquid crystal layer between the first and second substrates,
wherein an end of the first column spacer is a first distance away from the first data line in the first pixel region, and an end of the second column spacer is a second distance away from the second data line in the second pixel region, and wherein the second distance is different from the first distance,
wherein a first relative position of the first column spacer in the first pixel region is different from both a second relative position of the second column spacer in the second pixel region and a third relative position of the third column spacer in the third pixel region, and
wherein a number of the first column spacers is larger than both a number of the second column spacers and a number of the third column spacers, and the second relative position of the second column spacers and the third relative position of the third column spacers are shifted with respect to the first relative position of the first column spacer in opposite directions parallel to the gate line.

16. A liquid crystal display device, comprising:
a first substrate including first, second and third pixel regions;
a second substrate facing the first substrate;
first, second and third thin film transistors in the first, second and third pixel regions, respectively;
a passivation layer on the first, second and third thin film transistors and including first, second and third contact holes respectively exposing a drain electrode of each of the first, second and third thin film transistors;
a pixel electrode on the first substrate and in each of the first, second and third pixel regions, the pixel electrode connected to each of the first, second and third thin film transistors;
a common electrode on the first substrate or the second substrate;
first, second and third column spacers on the second substrate and corresponding to the first, second and third pixel regions, respectively; and
a liquid crystal layer between the first and second substrates,
wherein the first column spacer is a first distance away from the first contact hole exposing the drain electrode of the first thin film transistor, and the second column spacer is a second distance away from the second contact hole exposing the drain electrode of the second thin film transistor, and wherein the second distance is different from the first distance, and
wherein a number of the first column spacers is larger than both a number of the second column spacers and a number of the third column spacers, and all of bottom surfaces of the first, second and third column spacers at least partially overlap an upper surface of the passivation layer.

* * * * *